United States Patent Office 2,744,118
Patented May 1, 1956

2,744,118

PHTHALIMIDOPROPIONYLAMINOETHYL DISULFIDE AND PREPARATION

John Frederick Cavalla, London, England, assignor to Parke, Davis & Company, Detroit, Mich., a corporation of Michigan No Drawing. Application May 6, 1953,
Serial No. 353,451

Claims priority, application Great Britain May 12, 1952

5 Claims. (Cl. 260—326)

This invention relates to an improved method for the preparation of bis-(N-β-alanyl-2-aminoethyl)-disulfide, a valuable intermediate useful in the preparation of a growth factor for a number of microorganisms of the Lactobacillus genus. The invention also relates to bis-(β-phthalimidopropionyl-2-aminoethyl) disulfide, a new product useful in the production of bis-(N-β-alanyl-2-aminoethyl) disulfide.

In accordance with the invention, bis-(N-β-alanyl-2-aminoethyl) disulfide is produced by reacting β-phthalimidopropionyl chloride with bis-(β-aminoethyl)-disulfide in the presence of an alkaline agent to obtain bis-(β-phthalimidopropionyl-2-aminoethyl) disulfide and reacting this latter product with hydrazine. These various transformations may be diagrammatically illustrated as follows:

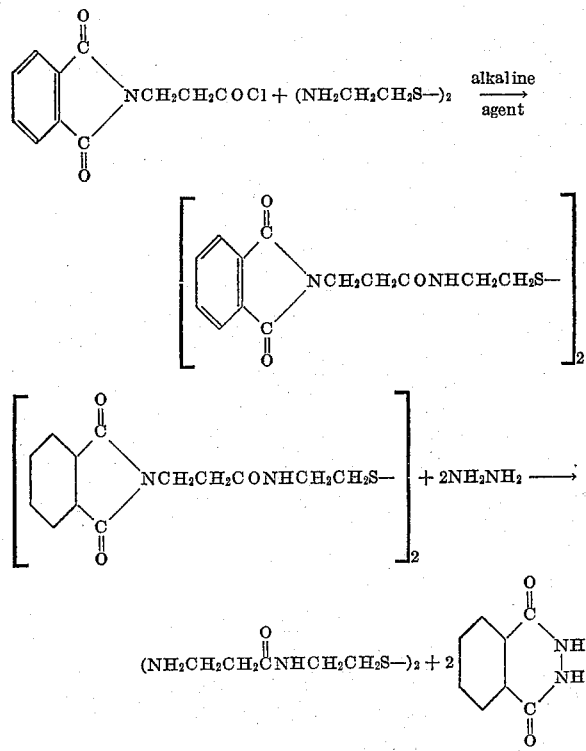

The first step of the process is carried out at a temperature between 0 and 40° C., preferably at 10–15° C. in either an aqueous or an anhydrous solvent. Some examples of the solvents which can be used are dialkyl ethers, aromatic hydrocarbons, lower aliphatic ethers of glycols, lower aliphatic ketones, cyclic ethers and aqueous solutions of the latter three types of solvents. Some specific examples of suitable solvents are benzene, diethyl ether, acetone, dioxane, ethylene glycol dimethyl ether, aqueous acetone, aqueous dioxane and the like. The alkaline agent may be any of the alkali metal hydroxides, alkaline earth hydroxides or tertiary amines. Some examples of suitable alkaline agents are sodium hydroxide, potassium hydroxide, magnesium oxide, calicum oxide and the like.

The bis-(β-phthalimidopropionyl-2-aminoethyl)-disulfide prepared as described above is sufficiently pure to use in the reaction with hydrazine without further purification. This step of the process is carried out at a temperature between 20 and 100° C., preferably at a temperature between 50 and 80° C. The hydrazine can be supplied to the reaction mixture in a number of different forms, for example, aqueous solutions of hydrazine, hydrazine hydrate and gaseous hydrazine can be used in the process. As solvents, either anhydrous or aqueous solutions of lower aliphatic alcohols, dioxane or monoglycol ethers can be employed.

Some examples of such solvents are methanol, ethanol, isopropanol, dioxane, ethylene glycol monomethyl ether, aqueous methanol, aqueous ethanol, aqueous isopropanol, aqueous dioxane, aqueous ethylene glycol monomethyl ether and the like. The bis-(β-phthalimidopropionyl-2-aminoethyl) disulfide starting material is insoluble in most of the solvents for the process, but as the reaction proceeds it slowly dissolves giving a clear solution. When such solvents are employed, the disappearance of the starting material is taken as evidence of the completion of the reaction. The by-product, 2,3-dihydro-1,4-phthalazinedione, is easily separated from the reaction mixture due to its insolubility in neutral and acid solutions. The desired bis-(β-alanyl-2-aminoethyl) disulfide is soluble in aqueous acid and can be isolated from such solutions in the form of an acid addition salt by evaporating the solution to dryness or to a very small volume.

The invention is illustrated by the following examples.

*Example 1*

A solution of 436 g. of β-phthalimidopropionyl chloride in 1000 cc. of dioxane is added dropwise with stirring to a solution consisting of 198 g. of bis-(β-aminoethyl) disulfide hydrochloride, 74 g. of sodium hydroxide, 400 cc. of water and 2000 cc. of dioxane. The addition is carried out at a temperature of 10–15° C. After about one-third of the acid chloride solution has been added, the addition is stopped and a small portion of a solution of 78 g. of sodium hydroxide in 100 cc. of water is added dropwise. The two solutions are then added alternately, first the acid chloride solution, then the base, until the addition has been completed. The reaction mixture is poured into 6 liters of water and the solid separated. The crude bis-(β-phthalimidopropionyl-2-aminoethyl) disulfide so obtained is washed and dried and then used in the next step of the process.

A solution of hydrazine (56 cc. of 85% hydrazine hydrate in 100 cc. of water) is added to a boiling suspension of 277 g. of bis-(β-phthalimidopropionyl-2-amino-ethyl) disulfide in 1500 cc. of methanol over a period of one hour and fifteen minutes. The reaction mixture is filtered and the filtrate acidified with 86 cc. of concentrated hydrochloric acid. The precipitate of 2,3-dihydro-1,4-phthalazinedione which separates is removed and the filtrate concentrated to a thick amber syrup. The residual syrup is diluted with 100 cc. of methanol and 1 liter of acetone and the bis-(β-alanyl-2-aminoethyl) disulfide dihydrochloride which separates in the form of light tan crystals collected; M. P. 221–22° C.; yield 71%.

*Example 2*

6 g. of magnesium oxide is added to a solution of bis-(β-aminoethyl) disulfide prepared according to the method of Nathan et al., J. Am. Chem. Soc., 63, 2361 (1941) from 7,7 g. of β-mercaptoethylamine, 60 cc. of hydrogen peroxide (1.5%) and 20 cc. of water. The mixture is cooled to about 2° C. and a dioxane solution (180 cc.) containing 24 g. of β-phthalimidopropionylchloride is added dropwise with stirring over a period of about one and one-half hours. The reaction mixture is stirred for about another half hour and then acidified with 80 cc. of 1N hydrochloric acid. The bis-(β-phthalimidopropionyl-2-aminoethyl) disulfide is collected, washed with water and dried. After recrystallization from chloroform-ethanol mixture, this product melts at 211–13° C.

A mixture consisting of 19 g. of crude bis-(β-phthalimidopropionyl-2-aminoethyl)disulfide, 1.7 cc. of hydrazine hydrate and 500 cc. of ethanol is heated under reflux for three hours. The reaction mixture is concentrated in vacuo and the residue extracted with 500 cc. of 2N hydrochloric acid. The acidic extract is filtered and evaporated in vacuo to the point of crystallization. The crystalline bis-(β-alanyl-2-aminoethyl)disulfide dihydrochloride which separates is collected and purified by recrystallization from aqueous alcohol; M.P. 221–2° C.; over-all yield 72%.

I claim:

1. Process for obtainnig bis-(β-alanyl-2-aminoethyl) disulfide which comprises condensing β-phthalimidopropionyl chloride with bis-(β-aminoethyl)-disulfide in the presence of an alkaline agent to obtain bis-(β-phthalimido-propionyl-2-aminoethyl)disulfide and reacting said bis-(β-phthalimidopropionyl-2-aminoethyl)-disulfide with hydrazine.

2. Bis-(β-phthalimidopropionyl-2-aminoethyl)-disulfide.

3. Process for preparing bis-(β-phthalimidopropionyl-2-aminoethyl)-disulfide which comprises condensing β-phthalimidopropionyl chloride with bis-(β-aminoethyl)-disulfide in the presence of an alkaline agent to obtain bis-(β-phthalimido-propionyl-2-aminoethyl) disulfide.

4. Process for preparing bis-(β-alanyl-2-aminoethyl) disulfide which comprises reacting bis-(β-phthalimidopropionyl-2-aminoethyl)-disulfide with hydrazine.

5. Process according to claim 4 in which the reaction is carried out at approximately reflux temperature and the reaction mixture is acidified with hydrochloric acid thereby precipitating 2,3-dihydro-1,4-phthalazinedione, removing the precipitate and recovering the bis-(β-alanyl-2-aminoethyl)-disulfide from the filtrate.

References Cited in the file of this patent
UNITED STATES PATENTS 2,680,767    Snell et al. _____ June 8, 1954

OTHER REFERENCES

Wittle et al.: "JACS," vol. 75, Apr. 5, 1953, pp. 1694 and 1698.

Baddily et al.: "J. Chem. Soc." 1951 (London) pp. 3425–26.

Reynolds et al.: "JACS," vol. 69, pp. 911–15 (1947).

Moersch et al.: "JACS," vol. 69 (1917), pp. 2619–21.